United States Patent [19]

Fogertey, Jr.

[11] Patent Number: 5,014,570
[45] Date of Patent: May 14, 1991

[54] STEERING WHEEL COVER

[76] Inventor: Frank R. Fogertey, Jr., 18140 Melrose, Glencoe, Mo. 63038

[21] Appl. No.: 428,961

[22] Filed: Oct. 30, 1989

[51] Int. Cl.$^5$ .......................... B62D 1/06; B65D 5/28
[52] U.S. Cl. ...................................... 74/558.5; 74/558; 229/194; 229/176; 229/DIG. 3
[58] Field of Search ............... 74/558, 558.5; 229/164, 229/176, 194, DIG. 3

[56] References Cited

U.S. PATENT DOCUMENTS

| | | | |
|---|---|---|---|
| 1,927,913 | 9/1933 | Bennett | 74/558.5 |
| 2,601,881 | 7/1952 | Oberlin | 74/558.5 |
| 3,010,636 | 11/1961 | Lugt, Jr. | 229/164 |
| 3,630,430 | 12/1971 | Struble | 229/164 |
| 4,102,377 | 7/1978 | Ostrem | 74/558.5 |
| 4,685,499 | 8/1987 | Black | 74/558 |
| 4,821,881 | 4/1989 | Yabe | 229/165 |

*Primary Examiner*—Allan D. Herrmann
*Assistant Examiner*—Winnie Yip
*Attorney, Agent, or Firm*—Kalish & Gilster

[57] ABSTRACT

A reusable, recyclable, reversible steering wheel cover is formed of preferably corrugated cardboard of a flat box construction with an open lower end comprised of a one-piece die cut blank having a front or driver-facing panel with an arcuate lower end, a back panel and a horizontal middle panel attached therebetween along impressed fold lines. The front and back panels are oppositely attached to the middle panel by horizontal, parallel impressed fold lines. Similar impressed fold lines connect longitudinal flanges at the opposite sides of each panel. Each flange on the front panel is provided with a notched tab to insert into and interlock with a slot formed along the length of fold lines which attach the back panel and side flanges adjacent thereto. Cut notches separate rectangular tabs at each end of the horizontal top panel from the flanges adjacent thereto.

13 Claims, 1 Drawing Sheet

STEERING WHEEL COVER

BACKGROUND OF THE INVENTION

1. Field of the Invention

This invention relates in general to covers for vehicle steering wheels and, more particularly, to a steering wheel cover for use as a sun shield having a box-type construction as formed through appropriate folding from a die cut blank.

2. Description of the Prior Art

Heretofore, steering wheel covers have been known for maintaining a steering wheel cool in hot climates. For example, U.S. Pat. No. 4,102,377 to Ostrem discloses a steering wheel cover having a cover sheet with an arcuate upper pocket section from which there extends a rectangular front skirt that overlies the lower half of the steering wheel. The Ostrem device is constructed of a plastic sheet lined with an open foam cell material and requires some stitching during construction.

U.S. Pat. No. 4,685,499 to Black shows a steering wheel sun shield which is comprised of either paper or plastic. The Black shield slips over and covers both sides of the wheel, and is provided with a slot to accomodate the vehicle steering column. Furthermore, the highly complex design of the Black device requires cropped corners and angled edges.

Known steering wheel covers do not disclose a cardboard box-type construction with an open lower back surface as in the present device and, furthermore, are more expensive to manufacture.

SUMMARY OF THE INVENTION

Therefore, it is an object of the present invention to provide a steering wheel cover (or shield) for protecting steering wheels of vehicles from the sun's rays and to thereby prevent heating thereof.

It is another object of this invention to provide a steering wheel cover of the character stated that is inexpensive to produce and lightweight.

It is a further object of the invention to provide a steering wheel cover of the character stated which may be facilely assembled by folding from a rigid die cut blank without necessity for use of tape, staples, stitches, brads or the like.

It is a still further object of the invention to provide a steering wheel cover of the character stated that is simple to install by merely dropping or slipping it over the top edge of the steering wheel.

It is yet another object of the invention to provide a steering wheel cover of the character stated and having an outer surface that is reflective in nature so as to enhance shielding from sun's rays.

Accordingly, the present invention comprises, briefly, a steering wheel cover of flat box construction with an open lower end. The steering wheel cover comprises a front panel having a predetermined length commensurate with the diameter of the steering wheel. There is also a back panel having a length approximately one-half the diameter of the steering wheel. A relatively shallow middle panel is flexibly attached and positioned perpendicularly between the front panel and the back panel such that they form parallel planes. Opposing sides are normally planar and perpendicular to the front, back and middle panels. The steering wheel cover is preferably formed of corrugated cardboard and has a white outer surface for enhanced reflection of light rays. The front panel includes an arcuate exposed lower end and the opposing sides of the cover each comprise longitudinal flanges foldably attached along impressed lines of weakness to corresponding front and back panels and have interlocking slots and tabs for maintaining the flanges adjacent relative to each other. Perpendicular cuts separate the longitudinal flanges from a rectangular tab located therebetween for facilitating formation of the steering wheel cover from a blank.

Other objects and features will be in part apparent and in part pointed out hereinbelow.

DESCRIPTION OF THE PREFERRED EMBODIMENT

Figure 1:
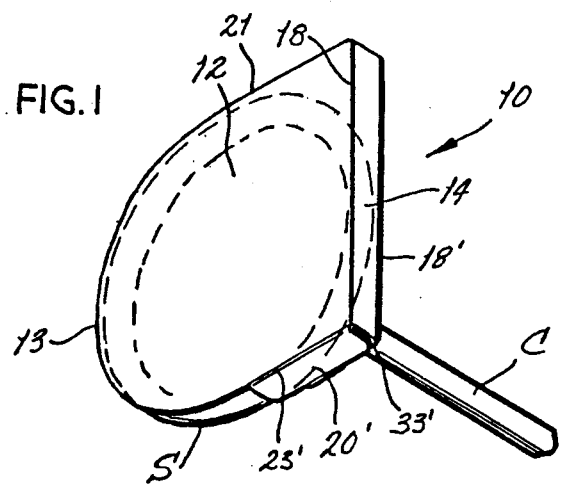
FIG. 1 is a perspective view of a steering wheel cover constructed in accordance with and embodying the present invention shown positioned upon a steering wheel.

Referring now by reference characters to the accompanying drawings, 10 generally designates a steering wheel cover, protector, heat shield or the like, constructed in accordance with and embodying the present invention. Cover 10 comprises generally an open-ended, flat box construction (FIG. 1), formed from a one-piece die cut blank B (FIG. 2), preferably of a stiff paper-like material, such as corrugated cardboard, for use as a sun shield for the steering wheel S (FIG. 1 phantom lines) of a vehicle (not shown). Blank B comprises a driver-facing or front panel 12 having an arcuate lower edge 13 and is bendably connected along the upper edge thereof by an impressed line of weakness or fold line 18 to a relatively shallow horizontal top or middle panel 14 which is in turn likewise connected by a parallel fold line 18' comprising its lower edge to a relatively short back panel 16. Each such connection is by a horizontal line of weakness such as fold lines 18, 18' pressed into the blank B during die-cutting of same.

Figure 2:
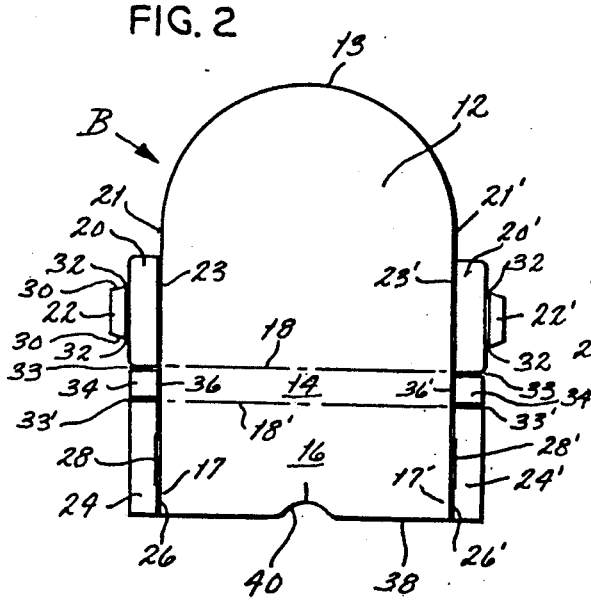
FIG. 2 is a plan view of the steering wheel cover of FIG. 1.
Figure 3:
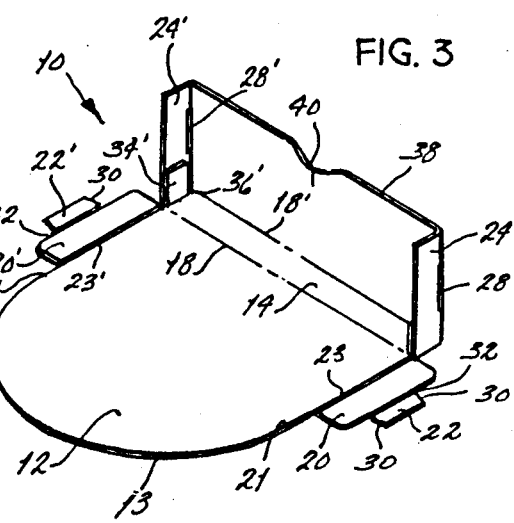
FIG. 3 is a perspective view of the steering wheel cover of FIG. 1 in a partially closed condition.
Figure 4:
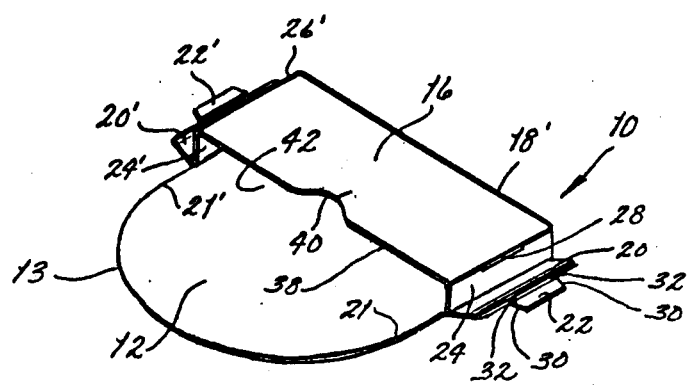
FIG. 4 is a perspective view of the steering wheel cover of FIG. 1 shown in a nearly fully closed condition.

Front panel 12 is provided on each side 21, 21' thereof with corresponding flanges 20, 20' extending from the top edge of panel 12 to approximately the beginning of arcuate edge 13 and having formed (preferably trapezoidally shaped) tabs 22, 22' attached thereto. Flanges 20, 20' are bendably connected to sides 21, 21' of panel 12 by impressed fold lines 23, 23', respectively. Back panel 16 is provided with flanges 24, 24' likewise connected to and extending along the entire length of sides 17, 17' of panel 16 by impressed fold lines 26, 26'. Centered along fold lines 26, 26' are slots 28, 28', respectively, for receiving corresponding tabs 22, 22' (FIGS. 2, 3 and 4). Tabs 22, 22' have angled edges 30 to facilitate sliding entrance of tabs 20, 20' into corresponding slots 28, 28' and notches 32 are provided at the base of tabs 22, 22' for interlocking connection with corresponding slots 28, 28'.

Tab 34 is located longitudinally between flanges 20 and 24 and is flexible along fold line 36. Likewise, tab 34' is formed between flanges 20' and 24' and is flexible along fold line 36'. Each tab 34, 34' is separated from adjacent flanges 20, 24 and 20', 24' respectively by cuts 33 (FIG. 2). Accordingly, one such tab 34, 34' is provided at each end of horizontal top panel 14. Back panel 16 is provided with a lower edge 38 having an arcuate indentation 40 for accomodating the vehicle steering column C. Edge 38 is substantially horizontal when cover 10 is appropriately positioned upon a steering wheel S.

For clarity, it will be assumed that FIGS. 2 and 3 illustrate, for the most part, the inner surfaces of cover 10, although it is understood that the various parts thereof may be flexed in the directions opposite those shown.

In assembly of cover 10, blank B is gently flexed along fold lines 18, 18', 23, 23', 26, 26' and 36, 36' (FIGS. 3 and 4). Tabs 34, 34' are flexed inwardly along fold lines 36, 36' followed by further inward flexing of flanges 24, 24' along lines 26, 26'. Subsequently, panel 16 is folded along line 18' to a position perpendicular to panel 14 causing flanges 24, 24' to overlap outwardly of respective tabs 34, 34'. Panel 12 is then folded inwardly along line 18 to a position perpendicular to panel 14 and in parallel and adjacent to panel 16 such that flanges 20, 20' are flexed along respective lines 23, 23' and overlap outwardly and adjacent to respective flanges 24, 24' to form sides for the box-like construction of cover 10. Simultaneously, tabs 22, 22' are pressingly guided through corresponding slots 28, 28' to provide simple interlocking securement of the steering wheel cover 10 in its operative form without need for taping, stitching, stapling or otherwise supplementing the construction thereof.

For use, steering wheel cover 10 may simply be positioned above a steering wheel S such that front panel 12 is facing the vehicle driver and back panel 16 is closest to the vehicle front window (not shown) space 42 (FIG. 4) of cover 10 may be aligned and simply dropped or slipped over steering wheel S so that cover 10 will come to rest thereon. The curvature of arcuate lower edge 13 on front panel 12 provides coverage of steering wheel S yet notably lacks sharp corners so that the driver's clothes will not be snagged thereby upon entering and exiting the vehicle.

Cover 10 may be made available in multiple sizes to fit various common vehicle wheels, for example, a large cover 10 for use in trucks and a smaller size for use in sports cars or the like. Preferably, blank B will be provided, at least on one side, with a white or other light color for use as the outside of cover 10 in order to provide maximum reflection of sunlight rays and to optimally reduce heat transfer to the steering wheel S.

Provision of cover 10 in a blank form, as at B (FIG. 2), facilitates shipping and storage as in a warehouse or retail establishment while simultaneously permitting extremely easy construction by a user. Once steering wheel cover 10 is assembled from blank B it may be left in that form in the user's vehicle. Even when cover 10 is not in place upon steering wheel S, the flat shape requires very little space for storage Thus, cover 10 may simply be placed in the back window, on an unused seat, or even vertically next to a passenger in the vehicle. However, if cover 10 should become soiled, it may be disassembled and reassembled, reversing the inside and outside. Furthermore, cover 10 may optionally permit use of the many flat surfaces 12, 14, 16 thereof as a background for messages (not shown) such as advertising, or for roadside assistance. Although preferably constructed of cardboard, which is inexpensive and conducive to recycling, cover 10 may also be formed of other materials, such as plastic.

In view of the foregoing, it will be seen that the several objects of the invention are achieved and other advantages are attained.

Although the foregoing includes a description of the best mode contemplated for carrying out the invention, various modifications are contemplated.

As various modifications could be made in the construction herein described and illustrated without departing from the scope of the invention, it is intended that all matter contained in the foregoing description or shown in the accompanying drawings shall be interpreted as illustrative rather than limiting.

What is claimed is:

1. A reusable, recyclable, reversible steering wheel cover of flat box construction with an open lower end, said steering wheel cover comprising:
   (a) a front panel having a predetermined length commensurate with a diameter of the steering wheel and an arcuate exposed normally lower end;
   (b) a back panel having a length approximately one-half the diameter of the steering wheel, an exposed lower edge and an arcuate indentation centered along said lower edge for accommodating a column of the steering wheel;
   (c) a relatively shallow middle panel flexibly attached and positioned perpendicularly between said front panel and said back panel; and
   (d) opposing sides normally planar and perpendicular to said front, back and middle panels.

2. The steering wheel cover of claim 1 wherein said cover is comprised of a foldable material.

3. The steering wheel cover of claim 1 wherein said foldable material is a corrugated paperboard substance.

4. The steering wheel cover of claim 3 wherein said foldable material is a stiff paperboard substance.

5. A steering wheel cover of claim 1 further comprising a first surface and a second surface; at least one of said first and second surfaces being white in color for enhanced reflection of light rays.

6. The steering wheel cover of claim 1 wherein said opposing sides each comprise longitudinal flanges foldably attached along an impressed lines of weakness to corresponding front and back panels, and keeper means for maintaining said flanges adjacent relative to each other.

7. The steering wheel cover of claim 6 wherein said longitudinal flanges each have a length equal to the length of said back panel.

8. A reusable, recyclable, reversible cover for the steering wheel of a vehicle, said cover being formed of a single, die-cut blank of foldable material and comprising:
   (a) a front panel provided with right and left edges;
   (b) a back panel provided with lower, right and left edges;
   (c) a relatively shallow middle panel foldably attached between said front panel and said back panel along lines of weakness and having right and left edges;
   (d) a first longitudinal flange foldably attached along a line of weakness to each said front panel right and left edge;
   (e) a trapezoidally shaped tab foldably attached at a widest side thereof along a line of weakness to each said first longitudinal flange opposite said front panel and having two opposed sides;

(f) a notch formed inwardly on said trapezoidally shaped tab at a point of intersection of each said opposed side thereof with each corresponding first longitudinal flange;

(g) a rectangular tab foldably attached along a line of weakness to each said middle panel left and right edge;

(h) a second longitudinal flange foldably attached along a line of weakness to each said back panel left and right edge; said lines of weakness of said back panel defining a longitudinal slot having two ends; said longitudinal slot for receiving said trapezoidally shaped tabs on corresponding first longitudinal flanges and said ends for interlocking with said notches; and (i) cuts to disengage each said rectangular tab from said first longitudinal flange and said second longitudinal flange adjacent thereto for facilitating formation of said steering wheel cover from said blank.

9. The steering wheel cover of in claim 8 wherein said foldable material is a stiff paperboard substance.

10. The steering wheel cover of claim 8 wherein said paperboard substance is of a corrugated nature.

11. The steering wheel cover of claim 8 wherein said blank has two flat surfaces, at least one of said surfaces being white in color for being positioned externally on said cover in the operative form thereof for enhanced reflection of light rays.

12. A steering wheel cover as defined in claim 8 wherein said back panel of said steering wheel cover has an arcuate indentation centered along the lower edge thereof for resting upon the column of such steering wheel.

13. The steering wheel cover of claim 8 wherein said front panel comprises an arcuate exposed lower end for preventing snagging of a user's clothing.

* * * * *